United States Patent
Watanabe

(10) Patent No.: US 8,174,714 B2
(45) Date of Patent: May 8, 2012

(54) SYSTEM AND METHOD FOR MANAGEMENT OF CONSUMABLE ITEMS IN AN IMAGE FORMING APPARATUS

(75) Inventor: Masashi Watanabe, Sunto-gun (JP)

(73) Assignees: Kabushiki Kaisha Toshiba, Tokyo (JP); Toshiba Tec Kabushiki Kaisha, Tokyo (JP)

( * ) Notice: Subject to any disclaimer, the term of this patent is extended or adjusted under 35 U.S.C. 154(b) by 1093 days.

(21) Appl. No.: 11/675,412

(22) Filed: Feb. 15, 2007

(65) Prior Publication Data

US 2008/0198028 A1 Aug. 21, 2008

(51) Int. Cl.
*G06K 15/00* (2006.01)
*G06F 3/12* (2006.01)
*B42B 9/00* (2006.01)
*G06Q 10/00* (2006.01)

(52) U.S. Cl. .......... 358/1.15; 358/1.16; 399/24; 399/25; 270/52.02; 705/22; 705/28

(58) Field of Classification Search ................ 358/1.16, 358/1.15; 270/52.02; 399/24, 25; 705/22, 705/28

See application file for complete search history.

(56) References Cited

U.S. PATENT DOCUMENTS

| | | | |
|---|---|---|---|
| 2003/0059050 A1* | 3/2003 | Hohberger et al. | 380/270 |
| 2005/0244169 A1* | 11/2005 | Ono | 399/12 |
| 2006/0168005 A1* | 7/2006 | Kanbara et al. | 709/206 |

FOREIGN PATENT DOCUMENTS

| | | |
|---|---|---|
| JP | 2005-033569 | 2/2005 |
| JP | 2005-221606 | 8/2005 |

* cited by examiner

*Primary Examiner* — Thomas Lett
(74) *Attorney, Agent, or Firm* — Turocy & Watson, LLP

(57) ABSTRACT

An image forming apparatus of an embodiment of the invention includes a first storage unit to store, based on stored information stored in wireless tags attached to a plurality of consumable items, an application to manage the stock number of the plurality of consumable items, a second storage unit to store replacement information to indicate replacement from a first consumable item installed in the image forming apparatus to a second consumable item included in the plurality of consumable items, a notification unit to notify the replacement information stored in the second storage unit, and a read unit to read, based on the replacement from the first consumable item to the second consumable item, the first stored information stored in a first wireless tag attached to the second consumable item.

18 Claims, 6 Drawing Sheets

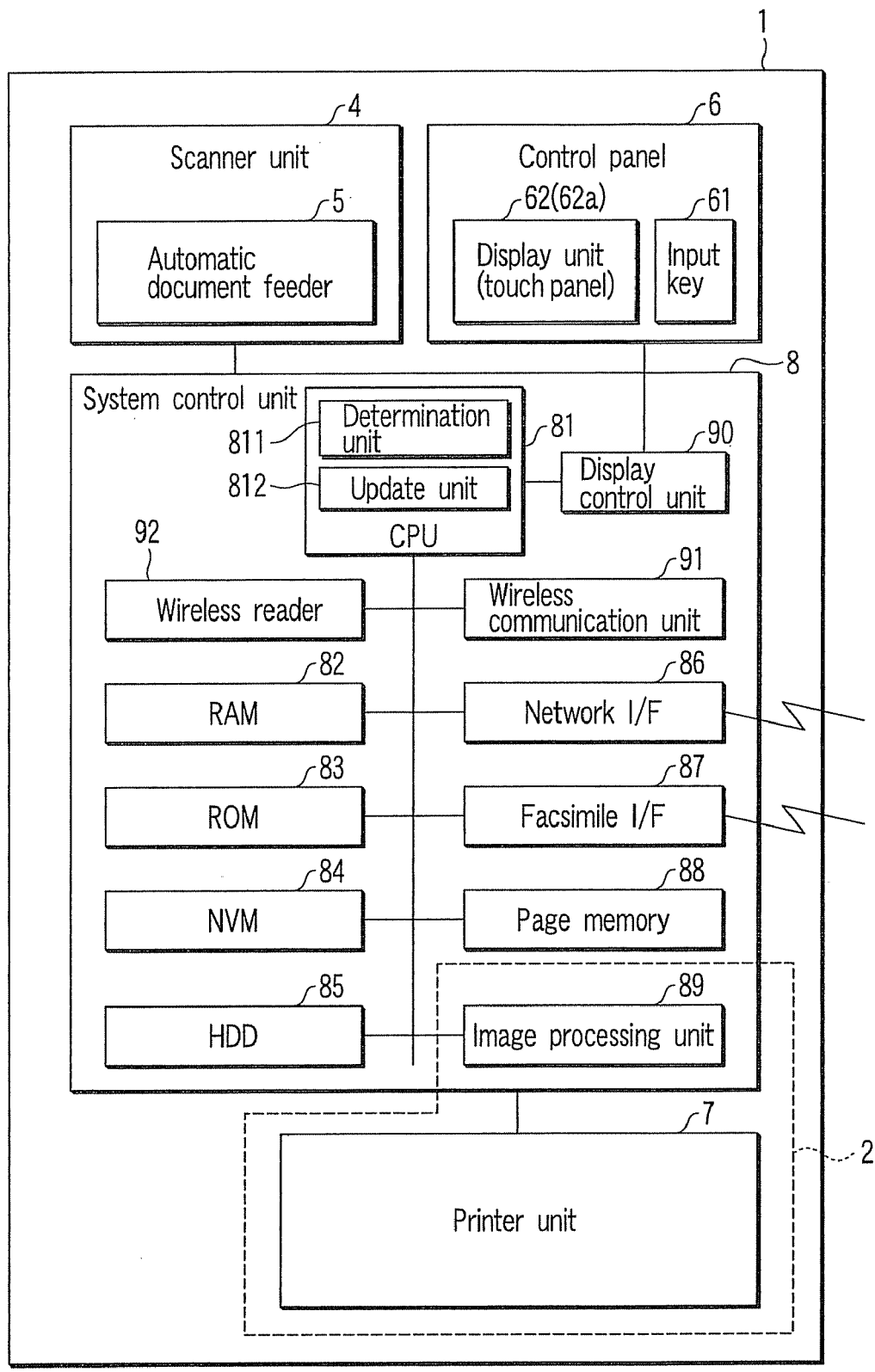
F I G. 2

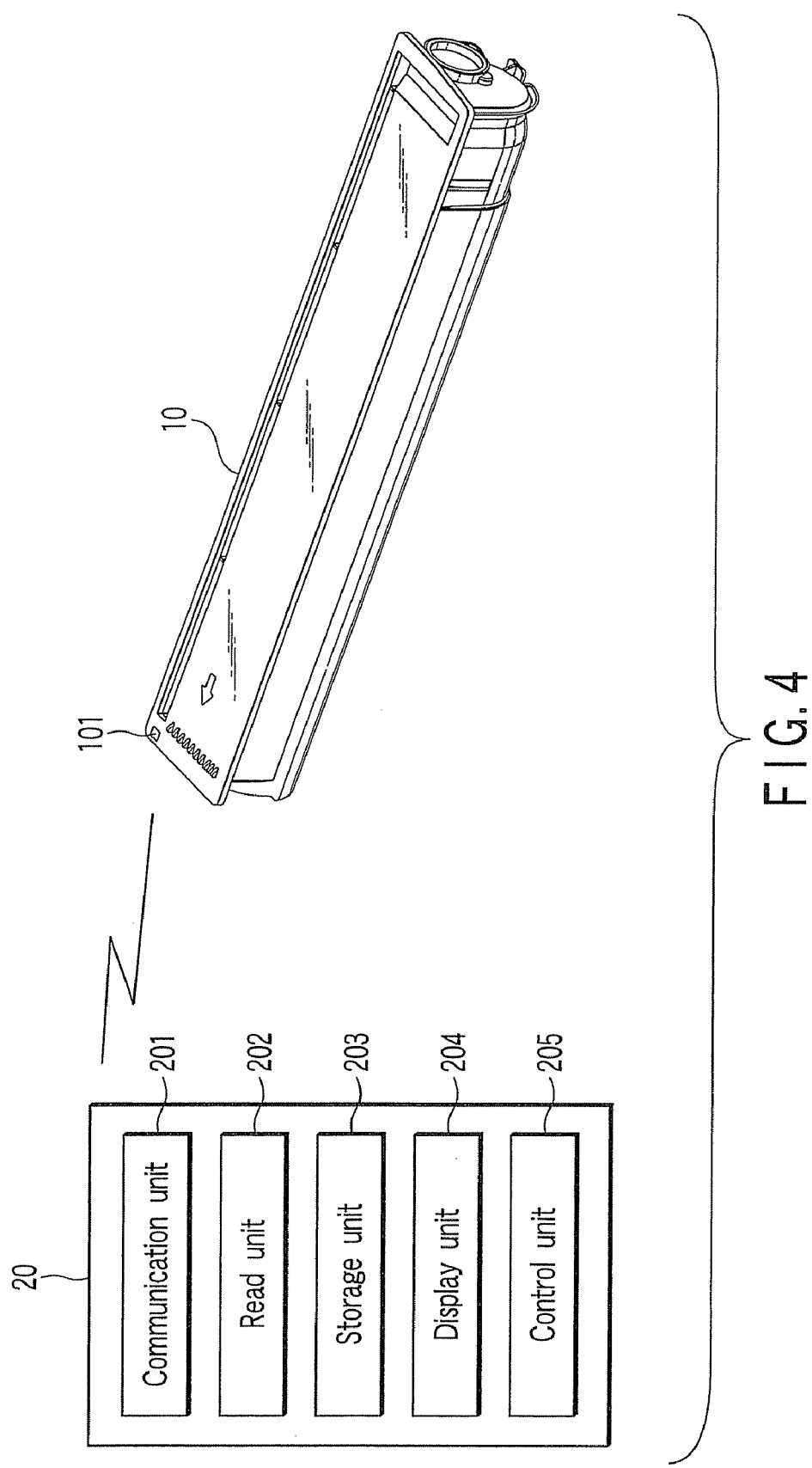
F I G. 4

|   | Model number | Stock number |
|---|---|---|
| 1 | A-123456 | 3 |
| 2 | B-112233 | 0 |
| 3 | C-99999 | 1 |

FIG. 5

|   | Model number | Stock number | Consumable item needing replacement | Insufficient consumable item | Re-placement |
|---|---|---|---|---|---|
| 1 | A-123456 | 3 | 1→Search | – | – |
| 2 | B-112233 | 0 | 1 | One→Contact address display | – |
| 3 | C-99999 | 1 | 0 | – | – |

FIG. 7

|   | Model number | Stock number | Consumable item needing replacement | Insufficient consumable item | Re-placement |
|---|---|---|---|---|---|
| 1 | A-123456 | 3 | 1→Search | – | Finished |
| 2 | B-112233 | 0 | 1 | One→Contact address display | – |
| 3 | C-99999 | 1 | 0 | – | – |

FIG. 8

|   | Model number | Stock number |
|---|---|---|
| 1 | A-123456 | 2 |
| 2 | B-112233 | 0 |
| 3 | C-99999 | 1 |

FIG. 9

SYSTEM AND METHOD FOR MANAGEMENT OF CONSUMABLE ITEMS IN AN IMAGE FORMING APPARATUS

BACKGROUND OF THE INVENTION

1. Field of the Invention

The present invention relates to an image forming apparatus to perform processing based on processing setting of a facsimile, an internet facsimile or the like.

2. Description of the Related Art

As is well known, in recent years, there is an image forming apparatus having a plurality of functions, such as a copy function, a facsimile function, a scanner function, a printer function or an image filing function. Besides, the image forming apparatus as stated above is connected to an arbitrary number of personal computers (hereinafter referred to as PC) and the outside through, for example, a network. Thus, data captured by the image forming apparatus can be captured into the PC or can be transmitted to the outside.

Hitherto, when a consumable item (for example, a toner cartridge) of an image forming apparatus needs replacement, a serviceman visits the manager who has the image forming apparatus and replaces the consumable item. In recent years, the manager holds consumable items in advance, and the manager himself or herself can replace the consumable items. In this case, the manager himself or herself confirms the number of consumable items and the kind, and manages them.

JP-A-2005-221606 discloses a structure in which an image forming apparatus using a consumable item provided with a non-contact tag having intrinsic identification information and a server to manage the consumable item are connected to each other through a network. Besides, there is disclosed a structure in which the image forming apparatus reads the identification information from the non-contact tag provided on the consumable item at the time when the consumable item is installed, and transmits the identification information to the server through the network, and the server calculates the consumable item consumption rate of the user using the image forming apparatus and the number of owned consumable items, and notifies the supply information of the consumable items by using electronic mail or a display unit of the apparatus.

However, in the invention of JP-A-2005-221606, there is not disclosed a structure in which when the replacement of a consumable item is needed, the manager easily finds the desired consumable item from a large stock.

Besides, JP-A-2005-33569 discloses a structure in which when an apparatus error, such as consumable item depletion, occurs in a vending machine type print supply apparatus, error data is immediately transmitted from a wireless communication device of the vending machine type print supply apparatus to a wireless communication device of a simple terminal apparatus, and the simple terminal apparatus causes the manager for the installation of the vending machine type print supply apparatus to recognize the apparatus error by a display corresponding to the error data, a buzzer or the like.

However, the invention of JP-A-2005-221606 is for causing the manager to recognize the apparatus error such as the consumable item depletion, and does not manage a stock of consumable items. Besides, there is not disclosed a structure in which when the replacement of a consumable item is needed, the manager easily finds the desired consumable item from a large stock.

BRIEF SUMMARY OF THE INVENTION

It is therefore an object of the invention to provide an image forming apparatus in which management and replacement of consumable items can be efficiently performed and operationality is excellent.

In order to achieve the object, an image forming apparatus of the invention includes first storage means for storing, based on stored information stored in wireless tags attached to a plurality of consumable items, an application to manage the stock number of the plurality of consumable items, second storage means for storing replacement information to indicate replacement from a first consumable item installed in the image forming apparatus to a second consumable item included in the plurality of consumable items, notification means for notifying the replacement information stored in the second storage means, read means for reading, based on the replacement from the first consumable item to the second consumable item, the first stored information stored in a first wireless tag attached to the second consumable item, determination means for comparing the first stored information read by the read means with the replacement information stored in the second storage means and for determining whether a comparison result satisfies a specified condition, and update means for updating, when the determination means determines that the specified condition is satisfied, the stock number of the plurality of consumable items in the application stored by the second storage means.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

FIG. 2 is a block diagram showing a structure of the image forming apparatus of the embodiment of the invention.

FIG. 4 is a block diagram showing a toner cartridge which can be installed to the image forming apparatus of the embodiment of the invention and a structure of a portable terminal.

FIG. 5 is a view showing a display of a management application to manage consumable items of the image forming apparatus of the embodiment of the invention.

FIG. 7 is a view showing a display of a management application to manage consumable items of the image forming apparatus of the embodiment of the invention.

FIG. 8 is a view showing a display of the management application to manage the consumable items of the image forming apparatus of the embodiment of the invention.

FIG. 9 is a view showing a display of the management application to manage the consumable items of the image forming apparatus of the embodiment of the invention.

DETAILED DESCRIPTION OF THE INVENTION

Figure 1:
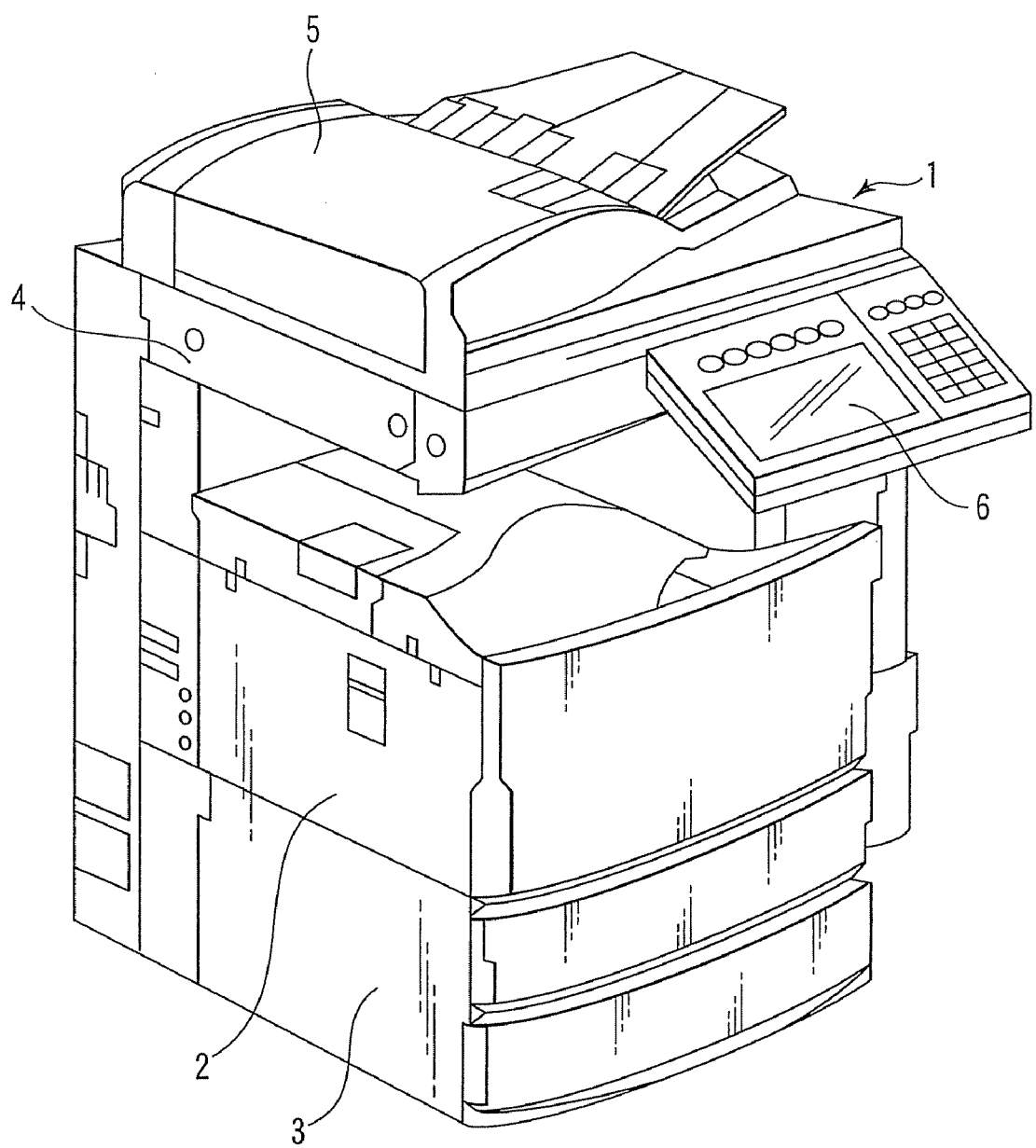
FIG. 1 is a view showing an outer appearance of an image forming apparatus of an embodiment of the invention.

Hereinafter, embodiments of the invention will be described with reference to the drawings. FIG. 1 shows a principle part of an image forming apparatus to which the invention can be applied.

An image forming apparatus 1 shown in FIG. 1 includes an image forming part main body 2 for outputting image information as an output image called, for example, a hard copy or printout, a sheet supply part 3 capable of supplying a sheet (output medium) of an arbitrary size used for the image output to the image forming unit main body 2, and a scanner unit (image read unit) 4 to capture, as image data, the image information as an object of image formation in the image formation unit main body 2 from a physical object (hereinafter referred to as an original document) holding the image information. Incidentally, the scanner unit 4 is integrally provided with an automatic document feeder 5 to discharge, in a case where the original document is sheet-like, after end of formation of the image output or capture (hereinafter referred to as reading) of the image information, the original document after the end of the reading to a discharge position from a reading position, and to guide a next original document to the reading position. Besides, an instruction input unit to instruct the start of image formation in the image formation unit main body 2 and the start of reading of the image information of an original document by the scanner unit 4, that is, a control panel (operation unit) 6 is provided at a specified position of the image forming apparatus 1, for example, the end part of the front of the image read unit 4.

FIG. 2 is a block diagram showing a structure of a control system of the image forming apparatus to which the invention can be applied. As shown in FIG. 2, in this image forming apparatus 1, the control panel 6, the scanner unit 4 and a printer unit 7 are connected to a system control unit 8.

The system control unit 8 controls the control panel 6, the scanner unit 4, the printer unit 7 and the like. Besides, the system control unit 8 has various functions to perform processings based on signals supplied from the control panel 6, the scanner unit 4 and the printer unit 7.

The control panel 6 includes an input key 61, a display unit 62 with a built-in touch panel 62a, and the like. An operation guide and keys (icons) selectable by the touch panel 62a, and the like are displayed on the display unit 62 based on the display control of the system control unit 8. In the control panel 6, the user can perform an input by the input key 61 or can input icons selectable by the touch panel 62a. The information (the input key 61 pressed by the user or information indicating the icon selectable by the touch panel 62a which the user touched) inputted by the user in the control panel 6 is supplied to the system control unit 8.

The scanner unit 4 converts an image of an original document into image data based on the control by the system control unit 8. The scanner unit 4 converts the image of the original document into the color or black and white digital image data. The scanner unit 4 supplies the digital image data as the image of the read original document to the system control unit 8.

The printer unit 7 prints the image on a sheet as an image formed medium based on the control by the system control unit 8. Besides, the result of print processing by the printer unit 7 is notified to the system control unit 8. The printer unit 7 performs color printing to form the color image on the image formed medium based on the color image data, or black and white printing to form the black and white image on the image formed medium based on the black and white image data. The printer unit 7 includes, for example, a transport unit (not shown) to transport the image formed medium, and an image forming unit (not shown) to form the color image or the black and white image on the image formed medium transported by the transport unit.

Besides, as shown in FIG. 2, the system control unit 8 includes a CPU (Central Processing Unit) 81, a RAM (Random Access Memory) 82, a ROM (Read Only Memory) 83, an NVM (Non-volatile memory) 84, a hard disk drive (HDD) 85, a network interface 86, a facsimile interface 87, a page memory 88, an image processing unit 89, a display control unit 90, a wireless communication unit 91, a wireless reader 92 and the like.

The CPU 81 executes a program stored in the ROM 83, the NVM 84 or the HDD 85. For example, the automatic document feeder 5 is realized such that the CPU 81 executes a control program based on the program and control data stored in the ROM 83, the NVM 84 or the HDD 85. Besides, the display control of the display unit 62 in the control panel 6 is executed by the CPU 81 based on the program and control data stored in the NVM 84 or the ROM 83.

Besides, the CPU 81 includes a determination unit 811 and an update unit 812. The determination unit 811 determines whether or not a consumable item is correctly replaced at the time of replacement of the consumable item. When the determination unit 811 determines that the consumable item is replaced, the update unit 812 updates a management application to manage the stock number of consumable items stored in, for example, the NVM 84 or the ROM 83. The consumable item is, for example, a toner cartridge, a drum or a fixing unit.

Since the management of the stock number of consumable items by the management application is an important point, this will be described later in detail.

The RAM 82 is a memory to temporarily store data for working or data for reference. Besides, the RAM 82 is used as a main memory for executing various processings based on various control programs. For example, in the RAM 82, at the time of operation of the image forming apparatus 1, the control program and control data are read, and information to be temporarily stored, such as information indicating the present setting content, is also stored.

Besides, for example, at a copy mode, the setting content includes copy magnification, the number of copies and the like in addition to the original document setting and sheet setting.

The ROM 83 is a nonvolatile memory. In the ROM 83, for example, the control program for controlling the image forming apparatus 1, control data and the like are stored. Besides, the ROM 83 stores display data to be displayed on the display unit 62 of the control panel 6.

The NVM 84 is a rewritable nonvolatile memory. The NVM 84 stores data such as system setting information. Besides, the NVM 84 may store display data to be displayed on the display unit 62 of the control panel 6.

The HDD 85 is a large capacity storage device. The HDD 85 stores various data such as various setting data, management data, control programs or control data. The HDD 85 stores also display data to be displayed on the display unit 62 of the control panel 6. Besides, the HDD 85 may store image data read by the scanner unit 4. Further, the HDD 85 may be used as a backup memory for various memories.

The network interface 86 communicates data via the network. In the image forming apparatus 1, the network print function of printing on a sheet the print data from an external equipment connected through the network is realized by the network interface 86.

The facsimile interface 87 is for transmitting and receiving facsimile data. In the image forming apparatus 1, the fax function is realized using the facsimile interface 87. For example, the facsimile reception processing is realized such that the facsimile data received by the facsimile interface 87 is black and white printed by the printer unit 7. Besides, the facsimile transmission processing is realized such that the image data of an original document read by the scanner unit 4 is converted into the facsimile data by the facsimile interface 87 and is transferred to a transmission destination.

The page memory 88 is a memory in which the image data to be printed by the printer unit 7 and the like are stored. The page memory 88 is controlled by a not-shown page memory controller. For example, in the case where the printer unit 7 performs a print processing, the color image data or black and white image data of a page to be printed by the printer unit 7 is expanded (stored) in the page memory 88.

The image processing unit 89 performs various image processings on the image data. In the image processing unit 89, for example, data scanned in the scanner unit 4 is compressed and is expanded for printout.

The display control unit 90 controls a screen to be displayed on the display unit 62. Based on the input information of the input key 61 by the user or the icon selectable by the touch panel 62a, the display control unit 120 reads the program and control data stored in the NVM 84 or the ROM 83 and displays the screen.

The wireless communication unit 91 sends data by wireless such as mail. The image forming apparatus 1 can send the information to inform the replacement of a consumable item by mail to a previously registered mail address (for example, the mail address of the portable terminal 20 owned by the manager).

The wireless reader 92 is for reading the stored information stored in the wireless tag 101 provided on the consumable item when the consumable item is replaced. The wireless reader 92 is provided at a position where the wireless tag 101 provided on the consumable item can be read, and one is provided for one place as the position where the consumable item is installed. That is, the number of the wireless readers 92 in the image forming apparatus 1 is equal to the number of replaceable consumable items.

Next, the structure of the control panel 6 will be described.

Figure 3:
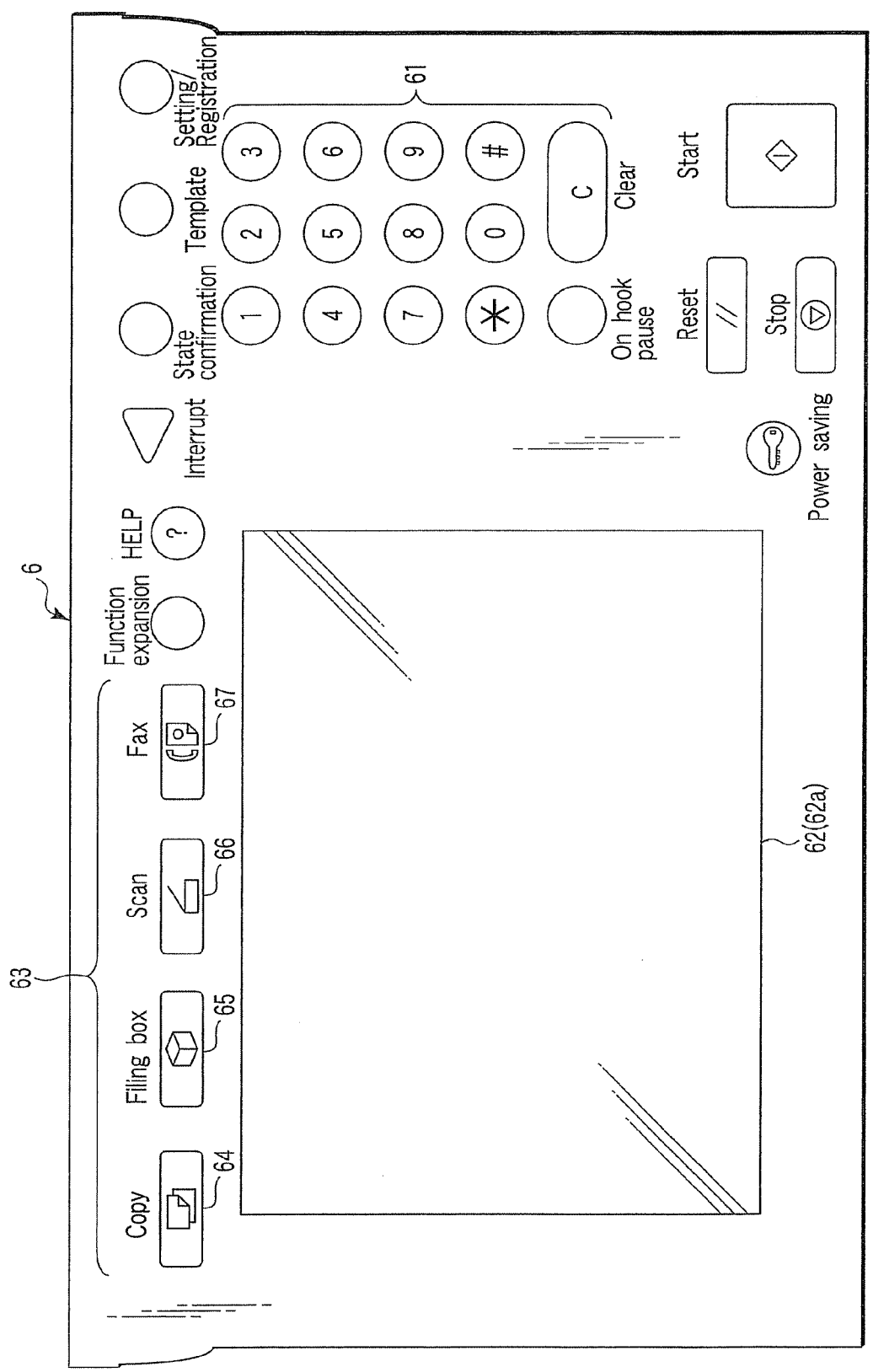
FIG. 3 is a view showing an outer appearance of a control panel of the image forming apparatus of the embodiment of the invention.

FIG. 3 is an outer appearance view for explaining a structural example of the control panel 6.

As shown in FIG. 3, the control panel 6 is provided with the input key 61, the display unit 62 with the built-in touch panel 62a, a function selection key 63 and the like.

The function selection key 63 is for selecting various functions. As the function selection key 63, there are provided, for example, a copy function selection key 64 for selecting a copy function, a filing box function selection key 65 for selecting a filing function of data, a scan function selection key 66 for selecting a scan function, a FAX function selection key 67 for selecting a fax function, a function expansion key for selecting another expanded function, and the like.

The input key 61 is for inputting a numeral or the like. The input key 61 is used for inputting information such as, for example, the number of copies, the copy magnification, or a password (identification number) for management.

The display unit 62 includes a liquid crystal display device with the built-in touch panel 62a. Various operation screens are displayed on the display unit 62. Besides, in addition to the operation guide, keys (icons) selectable by the touch panel 62a are displayed on each of the operation screens displayed on the display unit 62.

The display control unit 90 of the system control unit 8 determines the display content corresponding to the operation content by user or the operation state of each part. Based on this determination, the display control unit 90 reads the display data to be displayed on the display unit 62 from the NVM 84, the ROM 83 or a not-shown memory for display and displays it on the display unit 62. That is, the display control unit 90 display-controls the display unit 62 according to the operation content by the user or the operation state of each part.

FIG. 4 shows a toner cartridge 10 detachable from and attachable to the image forming apparatus 1 and a portable terminal 20 to read a wireless tag 101 provided on the toner cartridge 10. The wireless tag 101 is provided at, for example, a position as shown in FIG. 4 in a part of the toner cartridge 10. The wireless tag 101 stores stored information such as the model number of the toner cartridge 10, the intrinsic number of the toner cartridge 10, or information indicating the product name of the image forming apparatus 1 to which the toner cartridge 10 can be applied. The manager previously purchases consumable items, such as the toner cartridge 10 detachable from and attachable to the purchased image forming apparatus 1, and performs stock management. The manager reads the wireless tag 101 provided on the purchased toner cartridge 1 by a read unit 202 of the dedicated portable terminal 20. The stored information stored in the wireless tag 101 and read by the read unit 202 of the portable terminal 20 is managed by a dedicated management application as shown in FIG. 5. A communication unit 201 of the portable terminal 20 accesses the wireless communication unit 91 of the image forming apparatus 1, and the management application stored in the NVM 84 or the ROM 83 can be displayed on a display unit 204 of the portable terminal 20. Besides, it can also be confirmed by the control panel 6 of the image forming apparatus 1 and a monitor of a not-shown personal computer connected through the network I/F 86 of the image forming apparatus 1.

Further, the manager can also set the model number of the purchased toner cartridge 1, the intrinsic number, the information indicating the product name of the applicable image forming apparatus 1 and the like by using the control panel 6 of the image forming apparatus 1.

As shown in FIG. 5, it is indicated that the manager has three toner cartridges 10 with model number A-123456, zero toner cartridge 10 with model number B-112233, and one toner cartridge 10 with model number C-99999.

Here, a description will be given to a situation in which toner depletion occurs when the printer unit 7 forms an image on an image formed medium. When the occurrence of the toner depletion is detected, the CPU 81 of the image forming apparatus 1 controls the display control unit 90 to display a message to indicate replacement of the toner cartridge 10 on the display unit 62. The CPU 81 controls the NVM 84 or the ROM 83 to record replacement information. The replacement information is information indicating, for example, the model number of the toner cartridge 10 needing replacement, and the product name of the applicable image forming apparatus 1. The display unit 62 displays a two-dimensional bar code storing the replacement information of the toner cartridge 10 needing replacement.

Besides, when the sending of the two-dimensional bar code to the manager by mail is set, the CPU 81 of the image forming apparatus 1 performs control to attach the two-dimensional bar code to the mail through the wireless communication unit 91 or the network interface 86, and to send it to the mail address of the portable terminal 20 (which may be a PC) of the manager. Besides, when the printing of the two-dimensional bar code is set, the CPU 81 of the image forming apparatus 1 performs control to print the two-dimensional bar code by the printer unit 2. When the sending of the replacement information to the manager is set, the CPU 81 of the image forming apparatus 1 performs control to send the replacement information through the wireless communication unit 91 to the portable terminal 20 of the manager.

When the read unit 202 of the portable terminal 20 reads the replacement information stored in the two-dimensional bar code, the storage unit 203 stores the replacement information. Here, in the case where there are two or more consumable items needing replacement, the two-dimensional bar code can store the replacement information of the two or more consumable items collectively. Thus, also in the case where there are two or more consumable items needing replacement, the image forming apparatus 1 has only to send the mail with the two-dimensional bar code to the portable terminal 20 of the manager only once through the wireless communication unit 91 or the network interface 86.

Figure 6:
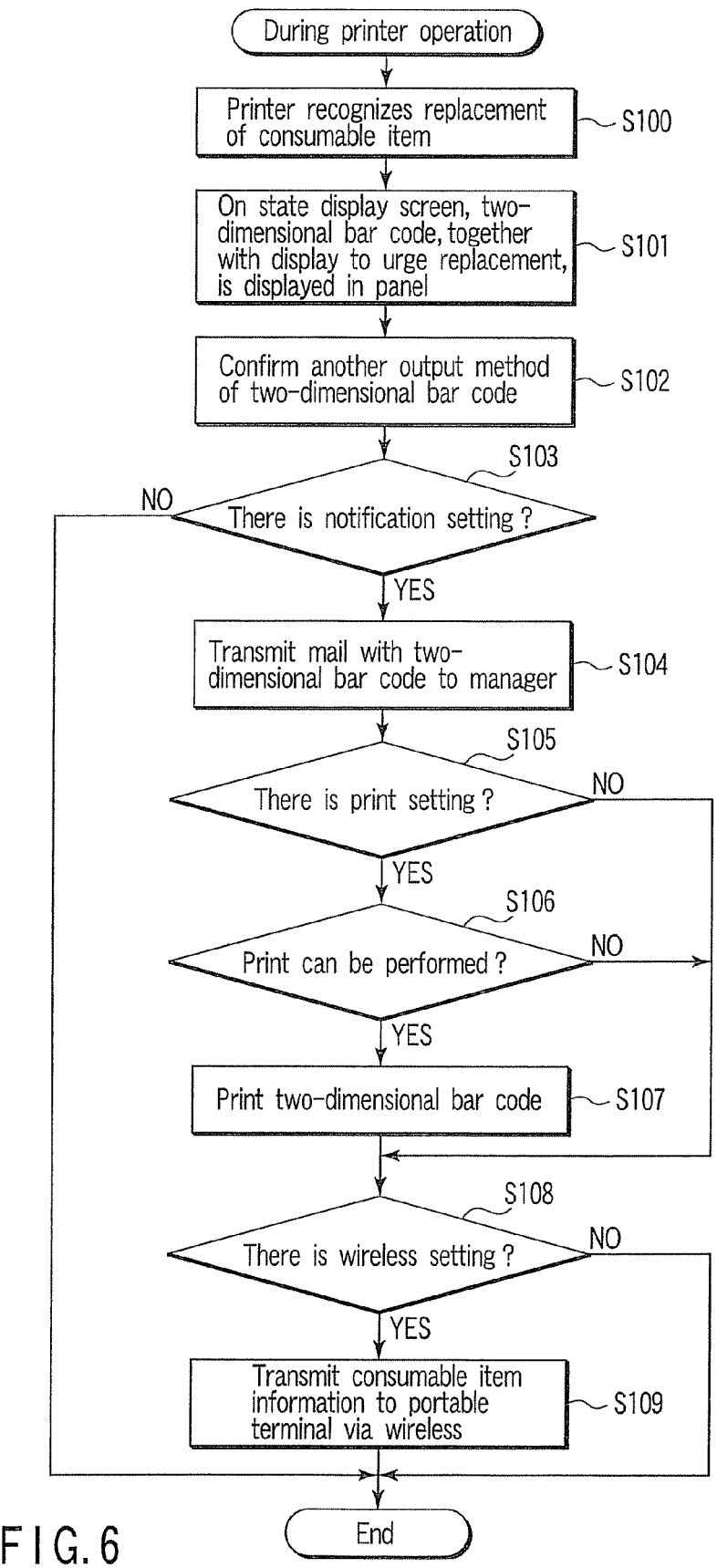
FIG. 6 is a flowchart for explaining an output method of a two-dimensional bar code by the image forming apparatus of the embodiment of the invention.

FIG. 6 is a flowchart indicating displaying of the replacement information of the consumable item. The CPU 81 of the image forming apparatus 1 recognizes that replacement of a consumable item is needed (step S100).

The display control unit 90 of the image forming apparatus 1 performs a display to urge the replacement of the consumable item on the control panel 6 and displays a two-dimensional bar code indicating the replacement information (step S101). The CPU 81 of the image forming apparatus 1 confirms whether or not another output method of the two-dimensional bar code is set (step S102).

The CPU 81 of the image forming apparatus 1 determines whether or not notification setting to send the two-dimensional bar code to the portable terminal 20 owned by the manager has been made (step S103). When the notification setting has been made (step S103, NO), the CPU 81 of the image forming apparatus 1 does not perform control to send the two-dimensional bar code to the manager, and terminates the other output of the two-dimensional bar code. When the notification setting is made (step S103, YES), the CPU 81 of the image forming apparatus 1 performs control to send the mail with the two-dimensional bar code to the manager through the wireless communication unit 91 or the network interface 86 (step S104).

Next, the CPU 81 of the image forming apparatus 1 determines whether or not print setting to print the two-dimensional bar code by the printer unit 7 has been made (step S105). When the print setting has been made (step S105, YES), the CPU 81 of the image forming apparatus 1 determines whether or not the two-dimensional bar code can be printed by the printer unit 7 (step S106). When the printing can be performed (step S106, YES), the CPU 81 of the image forming apparatus 1 performs control so that the printer unit 7 prints the two-dimensional bar code (step S107).

Next, the CPU 81 of the image forming apparatus 1 determines whether or not setting to send the replacement information of the consumable item to the portable terminal 20 of the manager has been made (step S108). In the case where the print setting has not been made (step S105, NO), or in the case where the printing can not be performed although the print setting has been made (step S106, NO), the CPU 81 of the image forming apparatus 1 determines whether or not setting to send the replacement information of the consumable item to the portable terminal 20 has been made (step S108). When setting to send the replacement information of the consumable item to the portable terminal 20 has been made (step S108, YES), the CPU 81 of the image forming apparatus 1 performs control to send the mail with the replacement information of the consumable item to the manager through the wireless communication unit 91. When the setting to send the replacement information of the consumable item to the portable terminal 20 has not been made (step S108, NO), the CPU 81 of the image forming apparatus 1 does not send the replacement information of the consumable item to the portable terminal 20 of the manager through the wireless communication unit 91.

Here, a description will be given to a situation in which one toner cartridge 10 with model number A-123456, and one toner cartridge 10 with model number B-112233 need replacement.

The management application to manage the stock number of consumable items is stored in the NVM 84 or the ROM 83. When the read unit 202 of the portable terminal 20 reads the replacement information stored in the two-dimensional bar code, the storage unit 203 stores the replacement information. Then, a control unit 205 of the portable terminal 20 performs control to acquire the management application as shown in FIG. 7 through the wireless communication unit 91 of the image forming apparatus 1.

The items of a model number, the stock number, a consumable item needing replacement, an insufficient consumable item, and replacement are displayed on the management application shown in FIG. 7. In accordance with the operation of the portable terminal 20, the portable terminal 20 communicates with the image forming apparatus 1, and the update unit 812 of the image forming apparatus 1 updates the management application. The column of the consumable item needing replacement in the management application is displayed based on the replacement information acquired by the read unit 202 of the portable terminal 20. The management application is displayed such that with respect to the toner cartridge 10 with model number A-123456, the stock number is three, and the number of consumable items needing replacement is one, with respect to the toner cartridge 10 with model number B-112233, the stock number is zero, the number of consumable items needing replacement is one, and the number of insufficient consumable items is one, and with respect to the cartridge 10 with model number C-99999, the stock number is one, and the number of consumable items needing replacement is zero.

At this time, in the column of the consumable item needing replacement of the toner cartridge 10 with model number A-123456, the numeral of 1 and the icon denoted as <search> are displayed.

The icon denoted as <search> means that a search can be made since the toner cartridge 10 with model number A-123456 is stocked. The manager selects the icon denoted as <search> corresponding to the toner cartridge 10 with model number A-123456, the control unit 205 of the portable terminal 20 starts a search program of the toner cartridge 10 with model number A-123456.

When the manager searches for the toner cartridge 10 with model number A-123456 from a large number of consumable items held in stock, when the communication unit 201 of the portable terminal 20 in which the search program has been started is brought close to the toner cartridge 10 with model number A-123456, the communication unit 201 of the portable terminal 20 communicates with the wireless tag 101 provided on the toner cartridge 10. Then, the portable terminal 20 can indicate, for example, on the display unit 204 of the portable terminal 20 that the toner cartridge 10 with model number A-123456 has been searched out. Alternatively, a warning sound to indicate that it has been searched out may be given.

Thus, when searching for the desired consumable item from the consumable items held in stock, the manager may not see the model number written on a box or main body. When the manager merely brings the portable terminal 20 close to the consumable item, the control unit 205 of the portable terminal 20 determines whether or not it is the consumable item desired by the manager. Thus, the manager can search for the desired consumable item without specific labor.

In the column of the insufficient consumable item of the toner cartridge 10 with model number B-112233, the numeral of 1 indicating the number of the shortage, and the icon denoted as <contact address display> are displayed.

The icon denoted as <contact address display> means that since there is no stock of the toner cartridge 10 with model number B-112233, ordering is required. When the manager selects the icon denoted as <contact address display> corresponding to the toner cartridge 10 with model number B-112233, the update unit 812 of the image forming apparatus 1 updates the management application to display the contact address of the toner cartridge 10 with model number B-112233.

Further, when the manager selects the contact address to acquire the toner cartridge 10 with model number B-112233, communication to the displayed contact address can also be made possible.

Thus, the manager can easily recognize that there is no stock of the consumable item needing replacement. Besides, the manager can easily acquire the contact address for acquiring the consumable item needing replacement.

Next, a description will be given to a state in which the manager inserts the acquired toner cartridge 10 with model number A-123456 into the image forming apparatus 1. In the inside of the image forming apparatus 1, a not-shown wireless reader similar to the portable terminal 20 is provided at the position where the wireless tag 101 provided on the toner cartridge 10 with model number A-123456 can be read. The wireless reader provided in the image forming apparatus 1 reads the wireless tag 101 provided on the inserted toner cartridge 10, and acquires the stored information. Here, the NVM 84 or the ROM 83 stores, as the replacement information, information indicating the model number A-123456 of the toner cartridge 10 and the product name of the image forming apparatus 1. The determination unit 811 of the CPU 81 of the image forming apparatus 1 compares the replacement information stored in the NVM 84 or the ROM 83 with the stored information read from the wireless tag 101 provided on the toner cartridge 10. The determination unit 811 of the CPU 81 compares the replacement information with the information included in the stored information and indicating the model number. When the determination unit 811 of the CPU 81 determines that the model number of the inserted toner cartridge 10 is not model number A-123456, it is determined that the toner cartridge 10 with a different model number or the toner cartridge 10 of a pirated edition is inserted.

When the manager inserts the toner cartridge 10 with model number A-123456 into the image forming apparatus 1, the wireless reader installed in the image forming apparatus 1 reads the wireless tag 101 provided on the toner cartridge 10 with model number A-123456. When the determination unit 811 of the CPU 81 determines that the toner cartridge 10 with model number A-123456 is correctly inserted, as shown in FIG. 7, "finished" is displayed in the column of the replacement of the toner cartridge 10 with model number A-123456, and it is indicated that the replacement is correctly completed. Thereafter, as shown in FIG. 8, the update unit 812 of the CPU 81 updates the management application such that as a stock of consumable items, the manager has two toner cartridges 10 with model number A-123456, zero toner cartridge 10 with model number B-112233, and one toner cartridge 10 with model number C-99999.

Here, for example, the NVM 84 or the ROM 83 records also the intrinsic number of the toner cartridge 10 read by the wireless reader from the toner cartridge 10 provided with the wireless tag 101, and manages it as the replacement history of the consumable item. Thus, even if the manager erroneously inserts again the toner cartridge 10 extracted from the image forming apparatus 1, the determination unit 811 of the CPU 81 can determine whether the inserted toner cartridge 10 is proper. That is, when the new toner cartridge 10 is inserted, the determination unit 811 of the CPU 81 can determine whether or not it is identical to the toner cartridge 10 inserted in the past based on the replacement history recorded in the NVM 84 or the ROM 83.

When the determination unit 811 of the CPU 81 determines that the newly inserted toner cartridge 10 is not the toner cartridge 10 inserted in the past, it is determined that the replacement is proper. The update unit 812 of the CPU 81 updates the stock number of consumable items managed in the management application.

When the determination unit 811 of the CPU 81 determines that the newly inserted toner cartridge 10 is the toner cartridge 10 inserted in the past, it is determined that the replacement is not proper. At this time, the update unit 812 of the CPU 81 does not update the stock number of consumable items managed in the management application. Besides, the display control unit 90 displays on the control panel 6 that the replacement is not proper, and can request the manager to confirm the replacement of the consumable item.

In the description, the plurality of wireless readers are installed in the image forming apparatus 1, and the wireless reader reads the wireless tag 101 provided on the toner cartridge 10. When the determination unit 811 of the CPU 81 determines that the replacement is proper, the update unit 812 of the CPU 81 updates the stock number of consumable items managed by the management application. Here, a description will be given to a method of managing the stock number of consumable items without installing a plurality of wireless readers in the image forming apparatus 1.

When the manager searches for the toner cartridge 10 with model number A-123456 from a large number of consumable items held in stock, when the communication unit 201 of the portable terminal 20 in which a search program is started is brought close to the toner cartridge 10 with model number A-123456, the communication unit 201 of the portable terminal 20 communicates with the wireless tag 101 provided on the toner cartridge 10. The control unit 205 of the portable terminal 20 can display on the display unit 204 that the toner cartridge 10 with model number A-123456 has been searched.

The control unit 205 of the portable terminal 20 can be configured to display "finished" in the column of replacement of the toner cartridge 10 with model number A-123456, as shown in FIG. 8, when the search for the toner cartridge 10 with model number A-123456 is completed.

Besides, the CPU 81 of the image forming apparatus 1 can also be configured to display "finished" in the column of replacement of the toner cartridge 10 with model number A-123456 when the manager inserts the toner cartridge 10 with model number A-123456 into the image forming apparatus 1 and the CPU 81 of the image forming apparatus 1 recognizes the insertion of the toner cartridge 10 with model number A-123456.

Besides, it can also be configured such that "finished" is displayed in the column of replacement of the toner cartridge 10 with model number A-123456 by means of the portable terminal 20 or the control panel 6 of the image forming apparatus 1 when the manager inserts the toner cartridge 10 with model number A-123456 into the image forming apparatus 1.

Thereafter, as shown in FIG. 8, the update unit 812 of the CPU 81 updates the management application to indicate that as a stock of consumable items, the manager has two toner cartridges 10 with model number A-123456, zero toner cartridge 10 with model number B-112233, and one toner cartridge 10 with model number C-99999.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A consumable item management system, comprising:
an image forming apparatus, comprising:
a first controller configured to acquire replacement information of a first consumable item;
a first wireless communicator configured to notify the replacement information to a portable terminal, the portable terminal being configured to search out a replacement item based on the replacement information notified by the image forming apparatus;
a reader configured to read stored information stored in a wireless tag provided on a second consumable item based on the replacement from the first consumable item to the second consumable item; and
a second controller configured to compare the replacement information with the stored information and determine whether the second consumable item is proper; and
the portable terminal comprising;
a third controller configured to acquire the replacement information;
a communicator configured to communicate with a wireless tag provided on a consumable item;
a fourth controller configured to determine whether the consumable item communicated with the portable terminal is the second consumable item based on the replacement information; and
a second wireless communicator configured to notify that the second consumable item is searched out when the consumable item communicated with the portable terminal is the second consumable item.

2. The system of claim 1, wherein the image forming apparatus comprises:
a memory configured to store a program to manage a stock number of a plurality of consumable items; and
wherein the second controller updates the stock number when the second consumable is proper.

3. The system of claim 2, wherein the memory stores the replacement information.

4. The system of claim 3, wherein the first wireless communicator sends a mail with the replacement information.

5. The system of claim 3, wherein;
the second controller displays a bar code storing the replacement information on display or prints out the bar code; and
the third controller reads the bar code and acquires the replacement information from the bar code.

6. The system of claim 3, wherein the first wireless communicator notifies information of the stock number of a plurality of consumable items to the portable terminal.

7. A consumable item management method comprising:
acquiring replacement information of a first consumable item by an image forming apparatus;
notifying the replacement information to a portable terminal by the image forming apparatus, the portable terminal being configured to search out a replacement item based on the replacement information notified by the image forming apparatus;
reading stored information stored in a wireless tag provided on a second consumable item based on the replacement from the first consumable item to the second consumable item by the image forming apparatus; and
comparing the replacement information with the stored information and determine whether the second consumable item is proper by the image forming apparatus; and
acquiring the replacement information by the portable terminal;
communicating with a wireless tag provided on a consumable item by the portable terminal;
determining whether the consumable item communicated with the portable terminal is the second consumable item based on the replacement information by the portable terminal; and
notifying that the second consumable item is searched out when the consumable item communicated with the portable terminal is the second consumable item by the portable terminal.

8. The method of claim 7 comprising:
storing a program to manage a stock number of a plurality of consumable items by the image forming apparatus; and
updating the stock number when the second consumable item is proper by the image forming apparatus.

9. The method of claim 8 comprising:
storing the replacement information by the image forming apparatus.

10. The method of claim 9 comprising:
sending a mail with the replacement information by the image forming apparatus.

11. The method of claim 9 comprising:
displaying a bar code storing the replacement information on display or prints out the bar code by the image forming apparatus; and
reading the bar code and acquires the replacement information from the bar code by the portable terminal.

12. The method of claim 9 comprising:
notifying information of the stock number of a plurality of consumable items to the portable terminal by the image forming apparatus.

13. A consumable item management system comprising:
an image forming apparatus, comprising:
first means for acquiring replacement information of a first consumable item;
second means for notifying the replacement information to a portable terminal, the portable terminal being configured to search out a replacement item based on the replacement information notified by the image forming apparatus;

third means for reading stored information stored in a wireless tag provided on a second consumable item based on the replacement from the first consumable item to the second consumable item; and fourth means for comparing the replacement information with the stored information and determine whether the second consumable item is proper; and the portable terminal comprising;

fifth means for acquiring the replacement information;

sixth means for communicating with a wireless tag provided on a consumable item;

seventh means for determining whether the consumable item communicated with the portable terminal is the second consumable item based on the replacement information; and eighth means for notifying that the second consumable item is searched out when the consumable item communicated with the portable terminal is the second consumable item.

14. The system of claim 13 wherein the image forming apparatus comprises:

ninth means for storing a program to manage a stock number of a plurality of consumable items; and wherein the fourth means updates the stock number when the second consumable item is proper.

15. The system of claim 14 wherein the ninth means stores the replacement information.

16. The system of claim 15 wherein the second means sends a mail with the replacement information.

17. The system of claim 15 wherein;

the fourth means displays a bar code storing the replacement information on display or prints out the bar code; and the fifth means reads the bar code and acquires the replacement information from the bar code.

18. The system of claim 15 wherein the second means notifies information of the stock number of a plurality of consumable items to the portable terminal.

* * * * *